United States Patent Office 3,087,839
Patented Apr. 30, 1963

3,087,839
WHEAT STARCH TREATMENT
Robert M. Hamilton, Minneapolis, Minn., assignor to General Mills, Inc., a corporation of Delaware
No Drawing. Filed Nov. 30, 1954, Ser. No. 472,249
7 Claims. (Cl. 127—38)

The present application relates to the treatment of wheat starch to improve its properties for use in the paper, textile, adhesive and food industries.

Wheat starches have been used for a variety of industrial applications but in some instances they have been subject to certain handicaps. For example, when wheat starch is cooked there is a distinct tendency for the formation of troublesome foams. Accordingly, it has been necessary in the past to cook wheat starch at lower temperatures in order to maintain the foaming problem at a minimum. A particularly vexing problem is encountered in the production of gum candies in which the wheat starch-sugar mixture is subjected to an extensive cooking operation to boil off excess water. During this time the candy mixture tends to foam excessively, and in order to overcome this difficulty a lower temperature than that employed for corn starch candy mixtures must be used. However, this lower temperature requires an extended cooking period and frequently adversely affects the properties of the candy.

Another difficulty is encountered in the use of wheat starch when the wheat starch is partially modified or converted by means of enzymes to reduce the viscosity of a starch dispersion, for example, to make it useful as a sizing in paper coating. It has been observed that when wheat starch is thus enzyme converted there is a residue which is insoluble or indispersible. This residue may form throughout the body of the sizing bath and also may form a slime or scum on the top of the bath. These insoluble particles become deposited on the surface of the paper and cause surface blemishes known as "fish eyes."

These difficulties have been observed with wheat starch but have not been encountered with corn starch. Accordingly, for certain applications wheat starch has been less desirable than corn starch. It has now been discovered that it is possible to treat wheat starch with alkali under closely controlled conditions to modify it in such a way as to overcome the foaming difficulties and to greatly reduce the insoluble residue on enzyme conversion. It is, therefore, an object of the present invention to provide a novel process of treating wheat starch with alkali under carefully controlled conditions so as to eliminate the foaming tendencies of the wheat starch and to greatly reduce the insoluble residue left on enzyme conversion.

The invention involves the treatment of the starch in the form of an aqueous dispersion with an alkaline material such that the pH of the dispersion is within the range of 10.6 to 11.2. The treatment is conducted at a temperature generally from 70 to 125° F. Generally a time period of 1 to 24 hours is sufficient. In order to speed up the process it is generally desirable to employ as high a temperature as possible. The particular temperature, however, depends upon the particular alkali employed and upon the subsequent processing of the starch. For example, it has been found that sodium hydroxide tends to paste the starch at lower concentrations than is the case with potassium hydroxide. If the starch is to be used at the place at which it is treated the pasting of the starch presents no particular problem. On the other hand, if the starch is to be recovered as a dry powder for shipment to the ultimate user it is preferred to avoid pasting of the starch. If pasting is avoided the starch is readily filterable and can be readily recovered from the main body of the liquid and can be readily dried for shipment in commerce.

Since, however, large quantities of starch are modified in the starch plants and are shipped to the user it is preferred to employ an alkali which will modify or remove the foaming constituents and also the enzyme insoluble residue in a short period of time and without pasting the starch so that the starch can be readily recovered. Sodium and potassium hydroxides are quite different in their activity in this regard. With sodium hydroxide it is found that pasting of the starch is likely to occur in the pH range of 10.8 to 11.2 particularly if the temperature is elevated above room temperature to any great extent. Moreover, the pH must be within this range in order to have the modification occur within a preferred time period. The pH may be allowed to go as low as 10.6 but this entails a more extended time period of treatment. With potassium hydroxide, on the other hand, it is found that the modification proceeds more readily at a pH of 10.6 than it does with sodium hydroxide. Moreover, a more elevated temperature can be tolerated without danger of pasting the starch. At the same time with potassium hydroxide it is possible to go to a pH of 11.2 and a temperature up to 125° F. to modify the starch in a short period of time without any great danger of pasting it.

Other alkalies such as lime are intermediate between sodium and potassium hydroxides in the rate at which they modify and the foam characteristics of the starch and in the way in which they tend to paste the starch. With lime it is possible to tolerate higher temperatures of conversion without pasting the starch than is possible with sodium hydroxide at the same pH. Lime, however, is less desirable than potassium hydroxide in that there is a tendency for some residual calcium salts to be present in the recovered starch. In some applications as for example where the starch is to be subjected to a subsequent acid conversion, this is not a disadvantage in that the subsequent acid treatment serves to remove any residual calcium salts. Of course, in those applications in which the presence of lime is not detrimental the lime treatment has the advantage of being less expensive than the other alkali.

The wheat starches thus treated do not have any tendency to foam when cooked and also do not have present any appreciable amounts of residual insoluble matter upon enzyme conversion.

The starches of the present invention may be subsequently modified in a number of ways to produce products which are extremely useful in industry. For example, acid modified starch is used in the production of gum candies. The following is a detailed description of how the present invention may be used for the production of such acid modified starch.

For this purpose it is preferred to treat the wheat starch slurry with from 0.5 to 1.5% of calcium hydroxide based on the weight of the starch solids for a period of approximately 1 hour at 125° F. The line is inexpensive and at the same time the process tolerates a high temperature without danger of pasting. The reaction is completed in a conveniently short period of time. Following this treatment the lime is neutralized with acid and the starch slurry is subjected to a conventional acid modification which may involve treatment of the slurry with HCl to produce a pH of approximately 1.0 to 1.5. The temperature is maintained at approximately 125° F. for approximately 2 hours. Thereafter the slurry is neutralized to approximately a pH of 5.5 and the modified starch filtered off and dried in a conventional manner.

The amount of lime may be varied within the above range to obtain a pH of from 10.6 to 11.2. The temperature likewise may be varied within the range of 90 to 125° F. but preferably is from 110 to 125° F. and the time period may vary between 1 and 4 hours. Since acid conversion is preferably carried out at approximately 125° F. it is desirable also to employ this temperature during the lime treatment. In this way it is not necessary to adjust the temperature of the entire body of the starch slurry between the alkaline and acid treatments.

The lime tolerates a temperature as high as 125° F. without danger of pasting the starch or of sensitizing it toward gelation under the conditions encountered in subsequent acid modification. At the same time the acid employed during the acid modification dissolves any calcium salts and removes them from the starch product. It will be apparent that any acid modification treatment may be employed in place of that specifically described herein. Examples of this type of treatment are as follows:

Example 1

Fifty gallons of 19.3 Baumé slurry of unmodified wheat starch was mixed with 2 lbs. of solid calcium hydroxide (1.0% $Ca(OH)_2$ based on starch solids). The temperature of the slurry was maintained at 125° C. for a period of 1 hour. The initial pH of the slurry was 11.2 and at the end of the 1 hour heating period was 11.1. Thereupon the pH was adjusted to 6.2 with HCl. Then 11.7 liters of 2.8 N HCl were added which brought the pH to 1.1. The temperature was maintained at 125° F. for 2 hours at which time the pH was adjusted to 5.8.

In carrying out the process the starch slurry was then filtered and dried in the usual manner. There was no problem with filtration; the slurry filtered readily. The treated starch was made into an aqueous slurry containing 1 lb. of starch per gallon of slurry. This slurry was then heated to 190° F. and maintained at that temperature for 3 hours. At the end of that time the density of the paste was determined and found to be between 0.95 and 1.0. For purposes of comparison a comparable acid modified wheat starch slurry which had not received the lime pretreatment as herein described, was tested in a comparable slurry subjected to the same temperature for the same period of time. At the end of this period it was found that this paste had a density of approximately 0.6 indicating the presence of a large quantity of air bubbles. The usual paste properties of acid-modified starches were unaltered by the present treatment.

Example 2

Example 1 was duplicated with the exception that the quantity of lime employed was approximately .53% based on the starch solids. It was found that when the resultant product was formed into a slurry and cooked as described in Example 1 the paste had a density of 0.888 whereas a similarly acid-modified wheat starch slurry which did not have the lime treatment had a density of approximately 0.6.

Example 3

The process of Example 1 was duplicated with the exception that the quantity of lime was approximately 1.5% based on the weight of the starch solids. The resultant acid-modified starch produced a slurry after cooking having a density of 0.989.

Another valuable application of the present invention is in the production of oxidized starch. In this situation the oxidation and the alkaline treatment can be carried on simultaneously since most oxidation agents work well under alkaline conditions. A preferred embodiment of the invention involves the use of sodium hydroxide to produce a pH in the slurry of from 10.6 to 11.2. The sodium hydroxide is less expensive than potassium hydroxide and at the same time does not leave the residue encountered with less expensive alkalies such as lime. The oxidizing agent is added to the slurry during the alkaline treatment. Preferred oxidizing agents are the alkali metal hypochlorites; sodium, potassium and ammonium, the sodium salt being preferred from the cost standpoint. Other oxidizing agents such as hydrogen peroxide and barium peroxide may be used in the process.

Oxidizing agents which leave an insoluble residue such as barium peroxide are not preferred except in those instances in which an insoluble residue is not objectionable. An insoluble residue is particularly undesirable in paper coating applications as well as in warp sizing applications. However, where one is not concerned with the possibility of an insoluble residue it is possible to employ such oxidizing agents as barium peroxide, calcium and magnesium hypochlorites and the like which result in some insoluble residue due to the multivalent metal ion.

In the process the alkali modification of the foam forming constituents proceeds along with the oxidation. The process may be carried out at any temperature from room temperature up to 125° F. At the higher temperatures it is apparent that the starch will be pasted if alkalies such as sodium hydroxide are used. If pasting is to be avoided a temperature below 110° F. should be maintained.

As the oxidation proceeds acid groups are formed which tend to neutralize part of the alkali present. This requires the addition of further quantities of alkali to maintain the pH within the range described above. If all of the alkali is added at the beginning of the reaction the pH is raised sufficiently high to paste or gelatinize the starch. By maintaining the pH within the range specified the desired effect upon foaming can be obtained while avoiding gelatinization of the starch. With some alkalies having a low solubility it is possible to add all of the alkali at the beginning of the reaction, the alkali dissolving as the dissolved alkali is removed from the sphere of the reaction. For example, calcium hydroxide may be added initially in a quantity greater than that which is soluble and the continued dissolving of the calcium hydroxide maintains the pH within the range described, as reaction proceeds.

In the oxidation of starch, carboxyl groups are formed on the starch molecule and in the presence of alkalies these carboxyl groups are converted to salts. If only polyvalent metal ions are persent in the slurry there is a tendency for the formation of salts of the polyvalent metals and the tendency for cross-linking of starch molecules resulting in the congealing of the starch paste. In order to avoid this situation it is preferred to include in the reaction mixture a monovalent alkali metal ion such as sodium, potassium or ammonium. Under these circumstances it is found that the monovalent ions preferentially form the salts of the carboxyl group notwithstanding the fact that the polyvalent metal ions may also be present. It is thus possible to use an oxidizing mixture containing an oxidizing agent, hydroxyl ions and both mono and polyvalent metal ions. For example, it is possible to use a mixture of calcium hydroxide and sodium hypochlorite or a mixture of calcium hypochlorite and sodium hydroxide. If calcium hypochlorite and calcium hydroxide are used there is a tendency for the formation of a starch gel which is less desirable than a low viscosity starch paste.

Examples of the simultaneous alkali treatment and oxidation of starch are as follows:

Example 4

850 gal. of 19.9 Baumé wheat starch slurry was heated to 100° C. and 33.8 gal. of sodium hypochlorite solution containing 11.7% available chlorine was added. Sodium hydroxide was added to bring the initial pH of the slurry to 11.1 and periodic additions of NaOH were made to maintain the pH within the range of 11 to 11.1 during the course of the reaction which covered a 3 hour period. At the end of this period the solution was neutralized to a pH of 5.9 by means of HCl. The solution was then filtered and dried in the conventional manner.

The treated starch was converted into a slurry containing 1 lb. of starch per gallon of slurry. This slurry was then heated to 190° F. and maintained at that temperature for 3 hours. At the end of that time the density of the paste was determined and found to be between 0.95 and 1.0. For purposes of comparison a comparable oxidized wheat starch slurry, but in which the pH had not been maintained as herein described, was tested in a comparable slurry subjected to the same temperature for the same period of time. At the end of this period it was found that this paste had a density of approximately 0.6 indicating the presence of a large quantity of air bubbles. The usual tendency of oxidized starches not to congeal was unaltered by the present treatment.

*Example 5*

To 850 gal. of a wheat starch slurry having a density of 19.9 Baumé was added 33.8 gal. of sodium hypochlorite solution containing 11.7% available chlorine. 26 lbs. of solid Ca(OH)$_2$ was added and the slurry maintained at 100° F. for 3 hours. Initial pH was 11.2 and the final pH was 10.9. During the 3 hour period of reaction the pH remained within these limits. The slurry was then treated and the starch recovered as in Example 4. The product had properties essentially the same as those described in Example 4 except that there was some tendency for the formation of some insoluble calcium salts in the slurry.

*Example 6*

To a suspension of 500 g. of unmodified wheat starch in 1 liter water is added 75 ml. of 3% hydrogen peroxide solution. The pH was maintained within the range of 10.9 to 11.2 by means of periodic additions of NaOH, during a 3 hour reaction period at 100° F. The solution was neutralized and the starch recovered as described in Example 4 to yield a product having comparable properties.

While NaOH can be used in a process similar to that described in the following example, the temperature must be at least 10° F. lower and consequently the reaction time about twice as long, in order to obtain a foam-free, easily filtered product.

*Example 7*

850 gallons of a 20 Baumé starch slurry were charged to a 1,000 gallon modification tank equipped with an agitator. Then 34.44 gallons of 2 N KOH were added slowly over a half hour period. The resultant slurry had a normality of 0.09 in the aqueous phase and a density of slightly less than 20 Baumé. The reaction was allowed to proceed for 2 hours at 110° F. whereupon the slurry was adjusted to a pH of 5.5 with dilute HCl. The starch was then filtered off and dried in the conventional manner. A sample of the starch was cooked and no tendency toward foaming was noted. A further sample was subjected to enzyme conversion with commercial amylase under conventional conditions and the resultant dispersion was substantially free from the insoluble residue ordinarily encountered with an untreated wheat starch sample.

While the above example represents a preferred embodiment of the invention numerous other variations may be made within the scope of the conditions previously referred to. The results obtainable are generally the same.

Now, therefore, I claim:

1. Process for the treatment of wheat starch which comprises subjecting a wheat starch slurry at a pH within the range of 10.6 to 11.2 to a temperature within the approximate range of 70–125° F. for a period of from 1 to 24 hours to eliminate the tendency for the wheat starch to foam and to eliminate the tendency for the formation of an insoluble residue upon enzyme conversion.

2. Process for the treatment of wheat starch which comprises subjecting a wheat starch slurry at a pH within the range of 10.8 to 11.2 to a temperature within the approximate range of 70–125° F. for a period of from 1 to 24 hours to eliminate the tendency for the wheat starch to foam and to eliminate the tendency for the formation of an insoluble residue upon enzyme conversion.

3. Process according to claim 1 in which the pH range is obtained by the use of an alkali metal hydroxide.

4. Process according to claim 1 in which the pH range is obtained by the use of an alkaline earth metal hydroxide.

5. Process for the treatment of wheat starch which comprises subjecting a wheat starch slurry to a temperature within the approximate range of 70–125° F. at a pH of from 10.6 to 11.2 in the presence of potassium hydroxide to eliminate the foaming tendency of the starch and to eliminate the tendency for the formation of an insoluble residue upon enzyme conversion.

6. Process of treating wheat starch which comprises subjecting a wheat starch slurry to a pH within the range of 10.8 and 11.2 in the presence of sodium hydroxide and at a temperature within the approximate range of 70 to 125° F. for a period of from 2 to 24 hours to eliminate the tendency for the wheat starch to foam and chemically oxidizing said slurry to eliminate the tendency for wheat starch to congeal.

7. Process for the treatment of wheat starch which comprises subjecting a wheat starch slurry at a pH of about 11 to a temperature within the approximate range of about 90 to 110° F. for a period of up to about 20 hours to eliminate the tendency for the wheat starch to foam and to improve the susceptibility of the wheat starch to enzyme conversion.

References Cited in the file of this patent

UNITED STATES PATENTS

| | | |
|---|---|---|
| 2,204,615 | Nivling | June 18, 1940 |
| 2,268,215 | Kerr | Dec. 30, 1941 |
| 2,328,537 | Felton et al. | Sept. 7, 1943 |
| 2,354,838 | Schopmeyer et al. | Aug. 1, 1944 |
| 2,373,016 | Daly et al. | Apr. 3, 1945 |
| 2,395,907 | Peckham | Mar. 5, 1946 |